April 12, 1927.  
A. A. HOWITZ  
1,624,342
RETARDING MECHANISM FOR INTERNAL COMBUSTION ENGINES
Filed Nov. 30, 1923
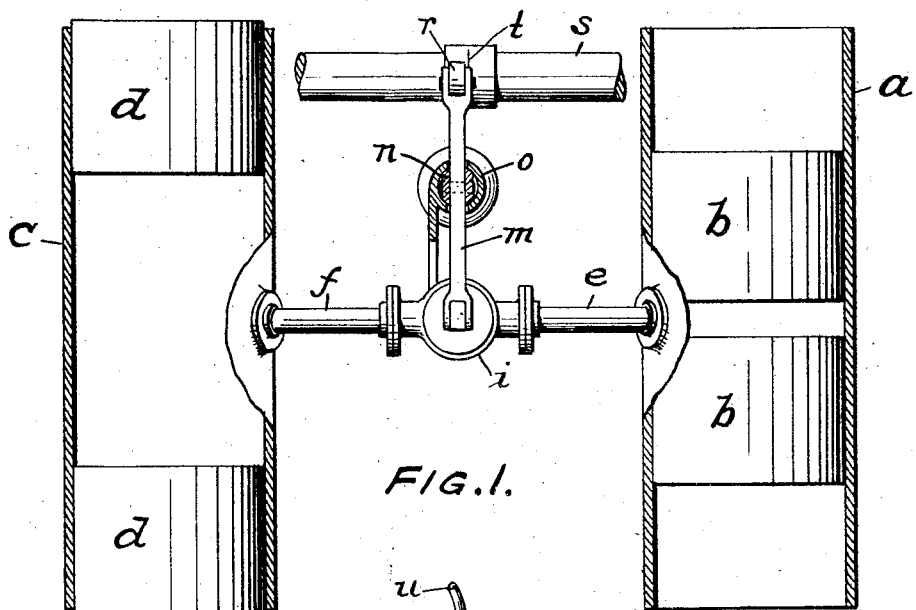
FIG.1.
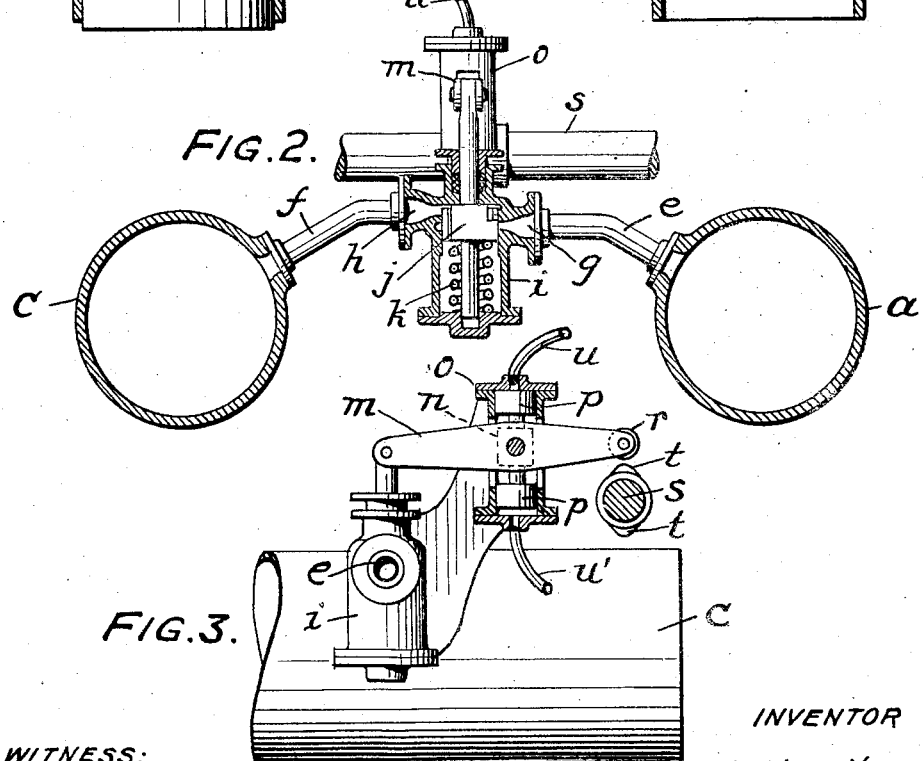
FIG.2.
FIG.3.
WITNESS:
Rob R Kitchel.
INVENTOR
Alfred A. Howitz
BY
Frank S. Busser
ATTORNEY.

Patented Apr. 12, 1927.

1,624,342

UNITED STATES PATENT OFFICE.

ALFRED A. HOWITZ, OF CHESTER, PENNSYLVANIA, ASSIGNOR TO SUN SHIPBUILDING & DRY DOCK COMPANY, OF CHESTER, PENNSYLVANIA, A CORPORATION OF PENNSYLVANIA.

RETARDING MECHANISM FOR INTERNAL-COMBUSTION ENGINES.

Application filed November 30, 1923. Serial No. 677,618.

My invention relates to oil and gas engines and has for its object, when fuel is cut off, to provide means to resist the inertia tending to maintain the reciprocating and rotary parts of the engine in motion and thus to stop the engine within a substantially reduced time. The invention is especially suitable for assisting in, and expediting, the reversal of an engine of the marine type.

The operation of an air or gas engine of either the so-called two cycle or four cycle type, with either single or opposed pistons, involves the compression of air on the compression stroke. During this stroke, work is performed on the piston, which work tends to retard or reverse the movement of the piston. Under usual working conditions, a charge of gas or fuel is injected at a specified time in the compression stroke. Ignition depends largely upon the temperature of the compressed air. The increased volume of gas thus formed does useful work in driving the piston in the opposite direction. When it is desired to stop the engine, fuel is cut off, but due to the inertia of the reciprocating parts, the engine will make a number of revolutions before coming to rest. This tendency to continue in operation is further augmented, particularly in a marine installation, by the momentum of the vessel.

Shutting off the fuel does away with the accelerating force which keeps the engine going, and the compression of air on the compression stroke tends to retard the motion of the reciprocating and rotating masses, but this same air acts in an expansive manner on the piston on the expansion stroke, which tends to keep the engine in operation in the same direction, although this driving force due to expansion is less powerful than the retarding force due to compression. The engine is therefore subject to a succession of alternating retarding and driving forces, and comes to rest ultimately only because each force of retardation exceeds the immediately following driving force.

It is the specific object of my invention to counteract the driving force and supplement the retarding force. More specifically, my invention contemplates relief of the pressure on the piston at the beginning of, and during, the expansion stroke and also, before the completion of such stroke, complete neutralization of such driving force and the creation instead of a retarding force. My invention, in its preferred form, where the engine comprises a plurality of cylinders, contemplates also an increase of pressure during the compression stroke, thereby increasing the ordinary retarding force.

A preferred embodiment of my invention is shown in the accompanying drawings, which illustrate the same applied to an engine comprising two cylinders of the opposed piston type.

Fig. 1 is a plan view, partly in section.

Fig. 2 is a cross-section through the cylinders and valve for controlling relief of pressure.

Fig. 3 is a partial view in side elevation.

The cylinder $a$ and pistons $b$, $b$ represent the so-called opposed piston type of engine. The invention is equally applicable to an engine of the more common single piston type. The engine diagrammed may be assumed to be of the two cycle type, in which fuel is injected into the space between the pistons and forms with the compressed air a mixture that explosively ignites due to the heat of compression. The invention is equally applicable to the four cycle type of engine, to that type of engine in which an explosive mixture of gas and oil is ignited by a spark, and, in fact, to any known type of gas or oil engine.

Extending from that part of the cylinder in which the air is compressed at or about the end of compression or beginning of expansion (in the form shown, the contracted space within the cylinder between the pistons when the latter have reached their position of nearest approach) is a pipe $e$ communicating with a port $g$ in a valve chamber $i$. The valve chamber has also a port $h$, which may communicate with the atmosphere, or (where there are a plurality of cylinders) preferably with a pipe $f$ connecting with the space enclosed between the pistons $d$, $d$, of another cylinder $c$. A valve $j$ is normally held, by a spring $k$, into position to close communication between the ports $g$ and $h$. Pipes $e$ and $f$ are, therefore, functionless during the regular operation of the engine.

Pipes $e$ and $f$ may be brought into communication by forcing down the valve $j$ against the pressure of spring $k$. To effect this, the stem of valve $j$ is connected with one end of a lever $m$, whose other end carries a roller $r$ adapted to be actuated by a cam or cams $t$ on the main cam shaft $s$. The lever $m$ between its ends is pivoted on a block $n$ slidable in a cylinder $o$, the wall of which is cut away to allow the lever $m$ to extend through it. Pistons $p$, $p$ within the cylinder $o$ are connected to the block $n$. Pipes $u$, $u'$ are connected with opposite ends of the cylinder $o$. These pipes are adapted to be alternatively connected with a source of compressed air. In the drawings, the pipe $u'$ is supposed to be connected with the air pressure supply while pipe $u$ is open to atmosphere, thereby lifting the pistons $p$, $p'$ and the block $n$, whereby the pivot of lver $m$ is raised to such height that the roller $r$ is out of the path of travel of the cams $t$.

Assume that it is desired to quickly stop the engine. At or about the same time that the fuel is shut off, the operator connects the pipe $u$ with compressed air and the pipe $u'$ with atmosphere. Pistons $p$, $p'$ and block $n$ immediately move down in the cylinder $o$, thereby swinging lever $m$, on the stem of valve $j$ as a pivot, into position to bring roller $r$ into the path of rotation of cams $t$. The engagement of a cam $t$ with roller $r$ swings lever $m$ on block $n$ as a pivot and moves down the valve $j$ and opens communication between ports $g$ and $h$.

The cams $t$ on the shaft $s$ are so positioned that one of these cams will operate to effect the described operation of valve $j$ at the proper time, which ordinarily will be at about the end of the compression stroke of one pair of pistons, say pistons $b$, $b$. A large volume of air will immediately escape through pipe $e$, thereby reducing the propulsion force acting on pistons $b$, $b$. In case the valve chamber $i$ is connected, as shown, with another cylinder $c$, the expanding air will flow through pipe $f$ into the piston chamber of cylinder $c$. As at this time the pistons $d$, $d$ are approaching each other, their movement will be resisted not only by the compression of the air that is already present, but also by the air that has flowed in through pipes $e$ and $f$, thereby increasing the force tending to arrest the approach of the pistons.

When pistons $d$, $d$ reach their position of closest approach, the cam shaft will have made another half revolution, bringing the other cam $t$ in contact with roller $r$ and again effecting the opening of valve $j$. This allows compressed air in cylinder $c$ to escape to cylinder $a$, reducing the propulsive force operating on pistons $d$, $d$, and increasing the resistance against the approach of pistons $b$, $b$.

Due to the escape of air from either cylinder at the beginning of an expansion stroke of its pistons, the air between the pistons, in the course of their movement of recession, will so far expand as to create a partial vacuum, which still further retards the pistons. This vacuum is not broken until the outward movement of the pistons is completed, exhaust opens, and scavenging air is admitted.

Thus, there is set up at least three forces tending to stop the engine: first, a substantial reduction in pressure at the beginning of the expansion stroke, which decreases the driving force; second, the creation of a partial vacuum during the expansion stroke, which creates resistance to movement, and, third, increase in pressure during the compression stroke, which increases resistance to movement. These forces act to supplement the normal retarding influence due to compression on the compression stroke and to counteract the normal driving force due to expansion on the expansion stroke. The inertia of the engine is therefore overcome with comparative rapidity.

It will be understood that my invention will be effective, although to a less degree, if the engine comprises only a single cylinder and the air is exhausted through pipe $e$ to atmosphere or to a partial vacuum. Even in the case of multi-cylinder engines, it may be preferred, in some cases, not to exhaust from one cylinder to another, although this arrangement is advantageous for the reasons described.

It is clear that changes may be made in the details of construction described without departing from my invention.

Having now fully described my invention, what I claim and desire to protect by Letters Patent is:

1. Braking mechanism for internal combustion engines comprising the combination of two cylinders and their respective pistons, the latter being so set that the expansion stroke of one occurs during the compression stroke of the other, outlets from both cylinders arranged to communicate, a valve normally closing such communication, but adapted to be opened to allow air compressed in one cylinder to escape into the other cylinder.

2. Braking mechanism for internal combustion engines, comprising the combination of two cylinders and their respective pistons, the latter being so set that the expansion stroke of one occurs during the compression stroke of the other, outlets from both cylinders arranged to communicate, a valve normally closing such communication, and means independent of the force of the air compressed by the pistons to operate the valve to open such communication and allow air compressed in one piston chamber to escape into the other piston chamber.

3. Braking mechanism for internal combustion engines, comprising the combination of two cylinders and their respective pistons, the latter being so set that the expansion stroke of one occurs during the compression stroke of the other, outlets from both cylinders arranged to communicate, a valve normally closing such communication, and means independent of the force of the air compressed by the pistons to operate the valve to open such communication and allow air compressed in one cylinder by the piston therein on its compression stroke to escape into the other cylinder during the compression stroke of the piston therein.

4. Braking mechanism for internal combustion engines, comprising the combination, with two cylinders and their respective pistons, the pistons of the two cylinders being so set that the expansion stroke of one occurs during the compression stroke of the other, of outlets from both cylinders arranged to communicate, a valve normally closing such communication, and means to operate the valve to allow air compressed by the piston of one cylinder to escape into the piston chamber of the other cylinder, thereby reducing the driving force of the air during the expansion stroke in one cylinder and increasing the retarding force during the compression stroke in the other cylinder.

5. Braking mechanism for internal combustion engines, comprising the combination, with two cylinders and their respective pistons, the pistons of the two cylinders being so set that the expansion stroke of one occurs during the compression stroke of the other, of outlets from both cylinders arranged to communicate, a valve normally closing said communication, driven mechanism and means operable by the driven mechanism to operate the valve to open said communication to allow air compressed by the piston of one cylinder to escape into the piston chamber of the other cylinder.

6. Braking mechanism for internal combustion engines, comprising the combination, with two cylinders and their respective pistons, the pistons of the two cylinders being so set that the expansion stroke of one occurs during the compression stroke of the other, of outlets from both cylinders arranged to communicate, a valve normally closing said communication, driven mechanism, means operable by the driven mechanism to operate the valve to open said communication to allow air compressed by the piston of one cylinder to escape into the piston chamber of the other cylinder, and a contrivance adapted to control the operation of said valve by the driving mechanism.

In testimony of which invention, I have hereunto set my hand, at Chester, Pa., on this sixth day of November, 1923.

ALFRED A. HOWITZ.